US008554357B2

(12) United States Patent
Fujita (10) Patent No.: US 8,554,357 B2
(45) Date of Patent: Oct. 8, 2013

(54) POSTURE CONTROL METHOD AND POSTURE CONTROL DEVICE (75) Inventor: Jun Fujita, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 901 days.

(21) Appl. No.: 12/669,635

(22) PCT Filed: Sep. 10, 2008

(86) PCT No.: PCT/JP2008/066336
§ 371 (c)(1),
(2), (4) Date: Jan. 19, 2010

(87) PCT Pub. No.: WO2009/035001
PCT Pub. Date: Mar. 19, 2009

(65) Prior Publication Data
US 2010/0204817 A1 Aug. 12, 2010

(30) Foreign Application Priority Data
Sep. 13, 2007 (JP) ................................. 2007-238427

(51) Int. Cl.
G06F 7/66 (2006.01)
G06F 19/00 (2011.01)
C21D 7/06 (2006.01)

(52) U.S. Cl.
USPC ................................ 700/186; 72/53; 700/159

(58) Field of Classification Search
USPC .............................................. 700/186; 72/73
See application file for complete search history.

(56) References Cited

U.S. PATENT DOCUMENTS

| 2006/0143890 A1 | 7/2006 | Linnemann et al. |
| 2007/0196190 A1* | 8/2007 | Bourne et al. ................ 409/131 |
| 2008/0058982 A1* | 3/2008 | Gray ............................. 700/159 |
| 2008/0223106 A1 | 9/2008 | Mori et al. |

FOREIGN PATENT DOCUMENTS

| JP | 62-095605 A | 5/1987 |
| JP | 6-51824 A | 2/1994 |
| JP | 2007-000940 A | 1/2007 |
| JP | 2007-181909 A | 7/2007 |

OTHER PUBLICATIONS

International Search Report of PCT/JP2008/066336, mailing date of Dec. 9, 2008.

(Continued)

Primary Examiner — Mohammad Ali
Assistant Examiner — Ziaul Karim
(74) Attorney, Agent, or Firm — Westerman, Hattori, Daniels & Adrian, LLP (57) ABSTRACT A posture control method controls a posture of a processing unit by measuring a distance between the processing unit and a process surface of a round pipe to be processed by the processing unit, using four distance measuring units. The method controls a posture about a pitch axis based on a difference obtained by subtracting a second measurement distance from a first measurement distance, and a difference obtained by subtracting a fourth measurement distance from a third measurement distance, controls a posture about a yaw axis based on a difference obtained by subtracting the third measurement distance from the first measurement distance, and a difference obtained by subtracting the fourth measurement distance from the second measurement distance, and controls a posture about a roll axis based on a difference between a first total distance obtained by adding the second measurement distance and the third measurement distance, and a second total distance obtained by adding the first measurement distance and the fourth measurement distance.

2 Claims, 3 Drawing Sheets (56) References Cited

OTHER PUBLICATIONS

Japanese Official Decision to Grant mailed Apr. 24, 2012, issued in corresponding Japanese Patent Application No. 2007-238427 (1 page).

Korean Official Decision to Grant mailed May 21, 2012, issued in corresponding Korean Patent Application No. 10-2010-7001658 (2 pages).

Extended European Search Report dated Jul. 10, 2013, issued in corresponding European Patent Application No. 08831023.0.

* cited by examiner

POSTURE CONTROL METHOD AND POSTURE CONTROL DEVICE

TECHNICAL FIELD

The present invention relates to a posture control method and a posture control device that control a posture of a processing unit relative to a process surface of a round pipe.

BACKGROUND ART

As conventional posture control devices, a tip tool guide apparatus that includes a rotation supporting unit arranged upright in a water chamber of a steam generator, a slide table provided in the rotation supporting unit, a manipulator mounted on the slide table, and a tip tool (processing unit) fixed to the end of the manipulator has been known (see Patent Document 1).

The tip tool guide apparatus moves (guides) the tip tool along a shot peening area of an inner peripheral surface of a pipe base provided in the water chamber by controlling the manipulator. At this time, the tip tool is pressed against the inner peripheral surface by the manipulator, and the posture of the tip tool follows the inner peripheral surface of the pipe base. In other words, the posture of the tip tool is controlled to have a predetermined posture by being pressed against and brought closely in contact with the inner peripheral surface by the manipulator.

[Patent Document 1] Japanese Patent Application Laid-open No. 2007-181909

DISCLOSURE OF INVENTION

Problem to be Solved by the Invention

However, in the conventional tip tool guide apparatus, when the tip tool is pressed against the inner peripheral surface by the manipulator, depending on the pressing direction, the rigidity of the tip tool guide apparatus cannot withstand the reaction force from the inner peripheral surface. Accordingly, the tip tool guide apparatus may bend slightly or be twisted, thereby making the tip tool supposed to have pressed against and brought closely in contact with the inner peripheral surface, to rise slightly. In this case, the raised tip tool may cause process failure. The rigidity of the tip tool guide apparatus may be increased to solve the problem, but the tip tool guide apparatus is designed to be brought into the water chamber. Due to the design restriction, it is difficult to increase the rigidity of the tip tool guide apparatus larger than a predetermined rigidity.

The present invention is intended to provide a posture control method and a posture control device that allow the processing unit to face the process surface of the round pipe at a desired posture by simple control.

Means for Solving Problem

According to an aspect of the present invention, a posture control method that controls a posture of a processing unit relative to a process surface by measuring a gap distance between the processing unit that performs processing on an inner peripheral surface or an outer peripheral surface of a round pipe and the process surface of the round pipe to be processed by the processing unit, includes: disposing a plurality of distance measuring units in the processing unit, and at least four given distance measuring units being arranged to face the process surface in a positional relationship of four apexes of a rectangle; controlling the posture of the processing unit in a rotational direction about a roll axis, based on a difference between a first total distance obtained by adding distances measured by two out of the four given distance measuring units located in one diagonal position, and a second total distance obtained by adding measurement distances measured by the other two distance measuring units located in the other diagonal position.

Advantageously, in the posture control method, the process surface that the distance measuring units face is divided into four virtual partitioned areas, based on a first virtual boundary line extended in a pipe axis direction of the process surface and a second virtual boundary line extended in a perpendicular direction perpendicular to the first virtual boundary line, and the four virtual partitioned areas are composed of a first virtual partitioned area, a second virtual partitioned area adjacent to the first virtual partitioned area in the pipe axis direction, a third virtual partitioned area adjacent to the first virtual partitioned area in the perpendicular direction, and a fourth virtual partitioned area adjacent to the second virtual partitioned area in the perpendicular direction and also adjacent to the third virtual partitioned area in the pipe axis direction. The posture control method further includes: positioning measuring units that, among the four given distance measuring units, makes a first distance measuring unit face the first virtual partitioned area, makes a second distance measuring unit face the second virtual partitioned area, makes a third distance measuring unit face the third virtual partitioned area, and makes a fourth distance measuring unit face the fourth virtual partitioned area. The controlling the posture controls the posture of the processing unit in the rotational direction about the roll axis, based on a difference between the first total distance obtained by adding a second measurement distance measured by the second distance measuring unit and a third measurement distance measured by the third distance measuring unit, and the second total distance obtained by adding a first measurement distance measured by the first distance measuring unit and a fourth measurement distance measured by the fourth distance measuring unit.

According to another aspect of the present invention, a posture control method that controls a posture of a processing unit relative to a process surface by measuring a gap distance between the processing unit that performs processing on an inner peripheral surface or an outer peripheral surface of a round pipe, and the process surface of the round pipe to be processed by the processing unit includes: determining positions of measuring units and controlling posture of processing unit. The determining positions of measuring units includes: disposing four distance measuring units arranged to face the process surface in a positional relationship of four apexes of a rectangle in the processing unit; defining four virtual partitioned areas on the process surface that the four distance measuring units face, based on a first virtual boundary line extended in a pipe axis direction of the process surface and a second virtual boundary line extended in a perpendicular direction perpendicular to the first virtual boundary line, the four virtual partitioned areas being composed of a first virtual partitioned area, a second virtual partitioned area adjacent to the first virtual partitioned area in the pipe axis direction, a third virtual partitioned area adjacent to the first virtual partitioned area in the perpendicular direction, and a fourth virtual partitioned area adjacent to the second virtual partitioned area in the perpendicular direction and also adjacent to the third virtual partitioned area in the pipe axis direction, positioning measuring units that, among the four distance measuring units, makes a first distance measuring unit face the first virtual partitioned area, makes a second distance measuring unit face the second virtual partitioned area, makes a third distance measuring unit face the third virtual partitioned area, and makes a fourth distance measuring unit face the fourth virtual partitioned area. The controlling posture of processing unit includes: controlling the posture of the processing unit in a rotational direction about a pitch axis, based on a difference obtained by subtracting a second measurement distance measured by the second distance measuring unit from a first measurement distance measured by the first distance measuring unit, and a difference obtained by subtracting a fourth measurement distance measured by the fourth distance measuring unit from a third measurement distance measured by the third distance measuring unit, controlling the posture of the processing unit in a rotational direction about a yaw axis, based on a difference obtained by subtracting the third measurement distance from the first measurement distance, and a difference obtained by subtracting the fourth measurement distance from the second measurement distance, and controlling the posture of the processing unit in a rotational direction about a roll axis, based on a difference between a first total distance obtained by adding the second measurement distance and the third measurement distance, and a second total distance obtained by adding the first measurement distance and the fourth measurement distance.

Advantageously, in the posture control method, the processing unit is formed to perform a following-operation in which the processing unit moves along the process surface with the posture thereof following the process surface, and the posture of the processing unit is feedback controlled by executing the controlling the posture in real time during the following-operation performed by the processing unit.

Advantageously, the posture control method further includes setting a gap distance between the processing unit and the process surface to be a set distance, based on a difference obtained by subtracting the set distance that is set in advance from an average distance of the first measurement distance, the second measurement distance, the third measurement distance, and the fourth measurement distance.

Advantageously, in the posture control method, the controlling the posture controls the posture of the processing unit, based on an initial posture of the processing unit about the pitch axis set in advance, an initial posture of the processing unit about the yaw axis set in advance, and an initial posture of the processing unit about the roll axis set in advance.

According to still another aspect of the present invention, a posture control device that controls a posture of a processing unit that performs processing on an inner peripheral surface or an outer peripheral surface of a round pipe includes: a plurality of distance measuring units that is included in the processing unit, and measures a gap distance between the processing unit and a process surface of the round pipe to be processed by the processing unit; and a posture controlling unit that controls the posture of the processing unit relative to the process surface, based on measurement results of at least four given distance measuring units, among the distance measuring units. The four given distance measuring units are arranged to face the process surface in a positional relationship of four apexes of a rectangle, and the posture controlling unit controls the posture of the processing unit in a rotational direction about a roll axis, based on a difference between a first total distance obtained by adding measurement distances measured by two distance measuring units located in one diagonal position among the four given distance measuring units, and a second total distance obtained by adding measurement distances measured by two distance measuring units located in another diagonal position.

Advantageously, in the posture control device, the process surface that the distance measuring units face is divided into four virtual partitioned areas, based on a first virtual boundary line extended in a pipe axis direction of the process surface, and a second virtual boundary line extended in a perpendicular direction perpendicular to the first virtual boundary line, the four virtual partitioned areas are composed of a first virtual partitioned area, a second virtual partitioned area adjacent to the first virtual partitioned area in the pipe axis direction, a third virtual partitioned area adjacent to the first virtual partitioned area in the perpendicular direction, and a fourth virtual partitioned area adjacent to the second virtual partitioned area in the perpendicular direction and also adjacent to the third virtual partitioned area in the pipe axis direction, among the four given distance measuring units, a first distance measuring unit is made to face the first virtual partitioned area, a second distance measuring unit is made to face the second virtual partitioned area, a third distance measuring unit is made to face the third virtual partitioned area, and a fourth distance measuring unit is made to face the fourth virtual partitioned area, and the posture controlling unit controls the posture of the processing unit in the rotational direction about the roll axis, based on a difference between the first total distance obtained by adding the second measurement distance measured by the second distance measuring unit and the third measurement distance measured by the third distance measuring unit, and the second total distance obtained by adding the first measurement distance measured by the first distance measuring unit and the fourth measurement distance measured by the fourth distance measuring unit.

According to still another aspect of the present invention, a posture control device that controls a posture of a processing unit that performs processing on an inner peripheral surface or an outer peripheral surface of a round pipe includes: four distance measuring units that are included, in the processing unit, and measure a gap distance between the processing unit and a process surface of the round pipe to be processed by the processing unit; and a posture controlling unit that, based on measurement results of the four distance measuring units, controls the posture of the processing unit relative to the process surface. The four distance measuring units are arranged to face the process surface in a positional relationship of four apexes of a rectangle, the process surface that the four distance measuring units face is divided into four virtual partitioned areas, based on a first virtual boundary line extended in a pipe axis direction of the process surface and a second virtual boundary line extended in a perpendicular direction perpendicular to the first virtual boundary line, the four virtual partitioned areas are composed of a first virtual partitioned area, a second virtual partitioned area adjacent to the first virtual partitioned area in the pipe axis direction, a third virtual partitioned area adjacent to the first virtual partitioned area in the perpendicular direction, and a fourth virtual partitioned area adjacent to the second virtual partitioned area in the perpendicular direction and also adjacent to the third virtual partitioned area in the pipe axis direction, among the four distance measuring units, a first distance measuring unit is made to face the first virtual partitioned area, a second distance measuring unit is made to face the second virtual partitioned area, a third distance measuring unit is made to face the third virtual partitioned area, and a fourth distance measuring unit is made to face the fourth virtual partitioned area. The posture controlling unit controls the posture of the processing unit in a rotational direction about a pitch axis, based on a difference obtained by subtracting a second measurement distance measured by the second distance measuring unit from a first measurement distance measured by the first distance measuring unit, and a difference obtained by subtracting a fourth measurement distance measured by the fourth distance measuring unit from a third measurement distance measured by the third distance measuring unit, controls the posture of the processing unit in a rotational direction about a yaw axis, based on a difference obtained by subtracting the third measurement distance from the first measurement distance, and a difference obtained by subtracting the fourth measurement distance from the second measurement distance, and controls the posture of the processing unit in a rotational direction about a roll axis, based on a difference between a first total distance obtained by adding the second measurement distance and the third measurement distance, and a second total distance obtained by adding the first measurement distance and the fourth measurement distance.

Advantageously, in the posture control device, the processing unit is formed to perform a following-operation in which the processing unit moves along the process surface with the posture thereof following the process surface, and the posture controlling unit feedback controls the posture of the processing unit by executing the controlling the posture in real time during the following-operation performed by the processing unit.

Advantageously, in the posture control device, the posture controlling unit so controls the posture of the processing unit that a gap distance between the processing unit and the process surface is a set distance, based on a difference obtained by subtracting the set distance that is set in advance from an average distance of the first measurement distance, the second measurement distance, the third measurement distance, and the fourth measurement distance.

Advantageously, in the posture control device, the posture controlling unit controls the posture of the processing unit, based on an initial posture of the processing unit about the pitch axis set in advance, an initial posture of the processing unit about the yaw axis set in advance, and an initial posture of the processing unit about the roll axis set in advance.

Effect of the Invention

In a posture control method and a posture control device, the posture of the processing unit is controlled about a roll axis, in a simple manner. At this time, because four given distance measuring units are used, for example, even if the posture of the processing unit is shifted by an angle component in the rotational direction about a pitch axis, or shifted by an angle component in the rotational direction about a yaw axis, the posture of the processing unit can be suitably controlled about the roll axis, without being affected by the displacement. To control the posture of the processing unit about the roll axis, at least four distance measuring units are to be used. However, depending on the situation, more than four distance measuring units may be used.

In another posture control method and another posture control device, the four given distance measuring units are suitably made to face four virtual partitioned areas. In other words, two distance measuring units (such as a second distance measuring unit and a third distance measuring unit, or a first distance measuring unit and a fourth distance measuring unit) located in a diagonal position do not overlap with a first virtual boundary line or a second virtual boundary line, or a plurality of distance measuring sensors does not face one virtual partitioned area. Accordingly, the direction to return the displacement of the posture of the processing unit about the roll axis to a predetermined posture can be obtained, from a difference between a first total distance and a second total distance. As a result, the posture of the processing unit can be correctly controlled about the roll axis.

In another posture control method and another posture control device, the posture of the processing unit can be controlled about the pitch axis, the yaw axis, and the roll axis, in a simple manner. By this control, the processing unit is made to face a process surface of a round pipe with the posture thereof following the process surface. Accordingly, by controlling the posture of the processing unit to follow the process surface, the tip tool need not be pressed against the inner peripheral surface (process surface) by the manipulator as in the conventional method. Because the reaction force from the process surface is not increased, the rigidity of the tip tool guide apparatus need not be increased.

The processing unit includes, for example, a tip tool used for shot peening, a testing device using ultrasound wave for testing, an imaging camera for a microscope, or a processing device for cutting and slicing. The cross-section of the round pipe may be round, elliptical, oval, or the like.

In another posture control method and another posture control device, during the following-operation performed by the processing unit, the posture of the processing unit can be feedback controlled. Accordingly, even if the processing unit is moved, the posture of the processing unit can always be maintained to follow the process surface.

In another posture control method and another posture control device, a gap distance between the processing unit and the process surface is set at a desired distance. Accordingly, the processing unit can perform processing, while maintaining the gap at a desired distance.

In another posture control method and another posture control device, by arranging the processing unit to a preset initial posture, the processing unit can perform processing on the process surface, while maintaining the initial posture thereof.

EXPLANATIONS OF LETTERS OR NUMERALS 3 cylindrical pipe
4 process surface
10 tip tool guide apparatus
17 tip tool
18 control device
43a first distance measuring sensor
43b second distance measuring sensor
43c third distance measuring sensor
43d fourth distance measuring sensor
52 motion correction controlling unit
K1 first virtual boundary line
K2 second virtual boundary line
E1 first virtual partitioned area
E2 second virtual partitioned area
E3 third virtual partitioned area
E4 fourth virtual partitioned area
L1 first measurement distance
L2 second measurement distance
L3 third measurement distance
L4 fourth measurement distance
Ls set distance component

BEST MODE(S) FOR CARRYING OUT THE INVENTION

Exemplary embodiments of a posture control method and a posture control device according to the present invention will be described with reference to the accompanying drawings. However, the present invention is not limited by the embodiments.

[First Embodiment]

Figure 1:
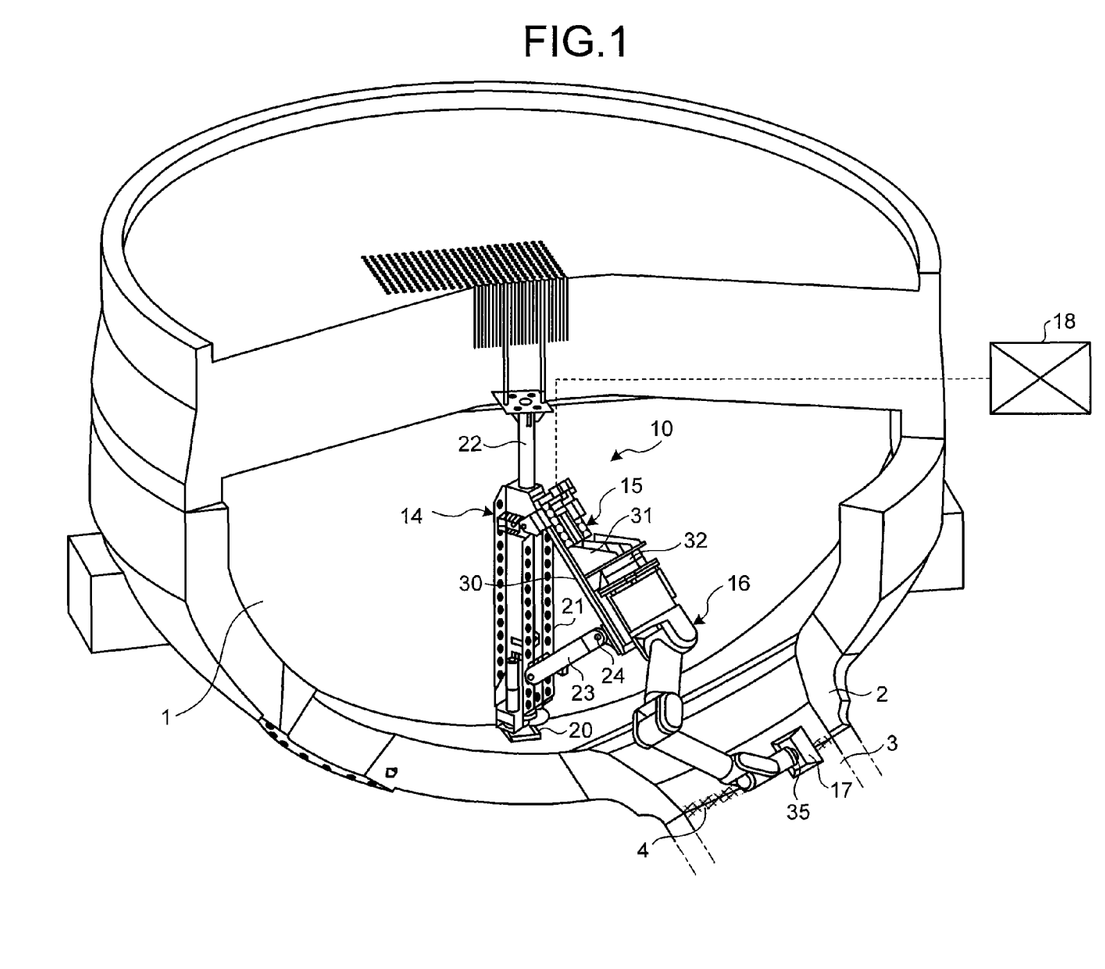
FIG. 1 is a perspective view of a tip tool guide apparatus according to a first embodiment.
Figure 2:
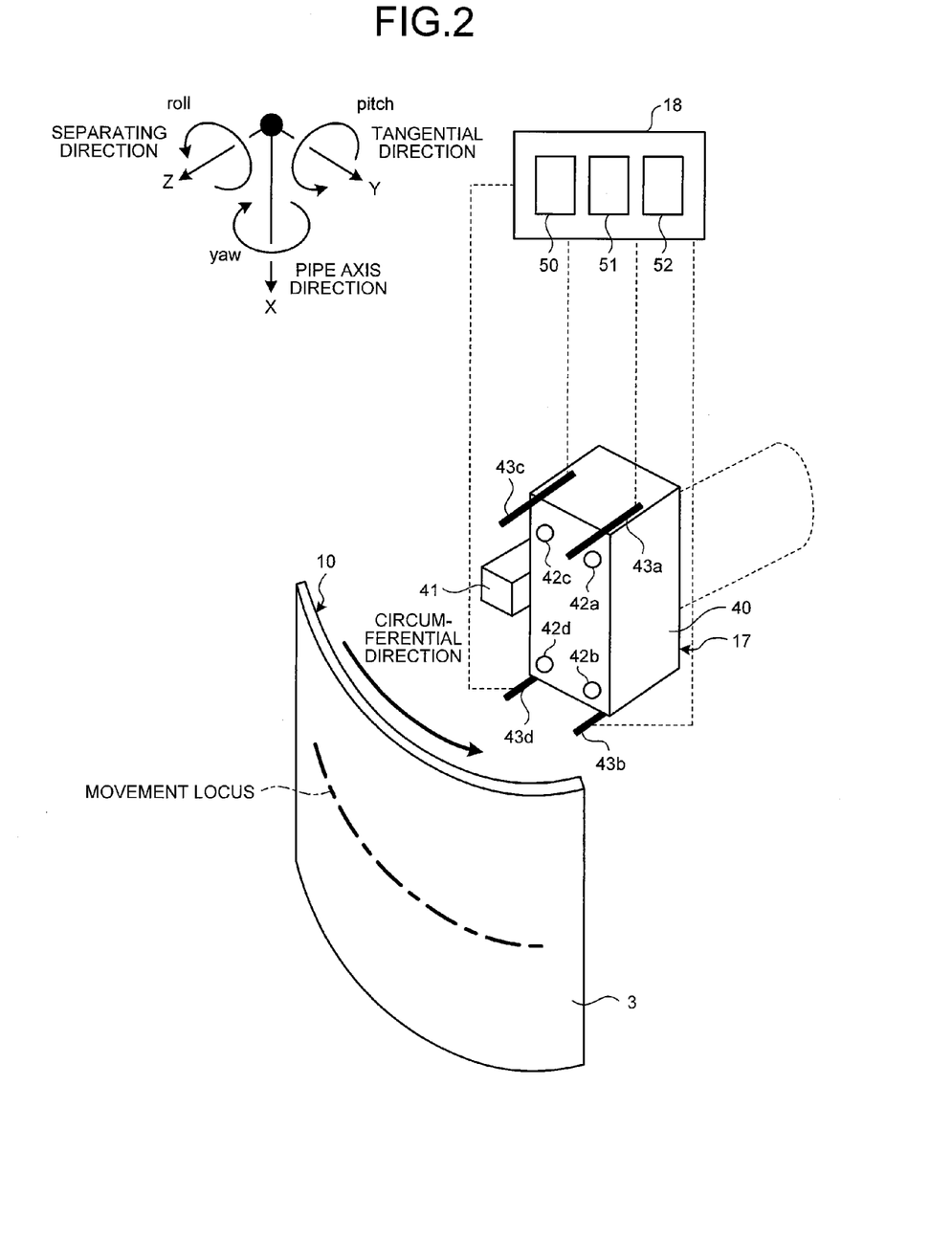
FIG. 2 is a schematic of a tip tool.
Figure 3:
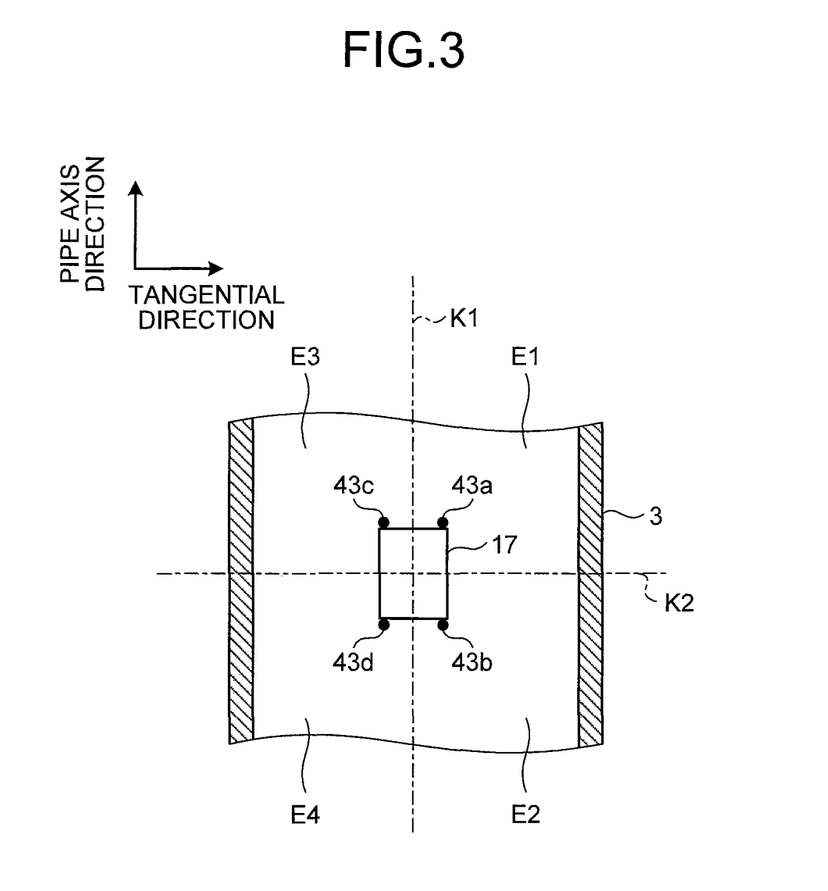
FIG. 3 is a schematic for explaining a measuring sensor positioning step.

FIG. 1 is a perspective view of a tip tool guide apparatus according to a present embodiment. FIG. 2 is a schematic of a tip tool. FIG. 3 is a schematic for explaining a measuring sensor positioning step.

With reference to FIG. 1, an example of applying a posture control method and a posture control device according to the present embodiment to a tip tool guide apparatus will now be described. A tip tool guide apparatus 10 is provided in a water chamber 1 in a steam generator of a pressurized water reactor type nuclear power plant. The tip tool guide apparatus 10 performs various processes on an inner peripheral surface (hereinafter, referred to as a process surface 4) of a welded portion between a pipe base 2 provided at a lower portion of the water chamber 1 and a cylindrical pipe (round pipe) 3 connected to the pipe base 2.

The tip tool guide apparatus 10 includes a rotation supporting unit 14 arranged upright from the bottom to the ceiling of the water chamber 1, a slide table 15 that has a sliding mechanism and detachably connected to the rotation supporting unit 14, a manipulator 16 detachably mounted on the slide table 15, and a tip tool 17 (processing unit) detachably mounted on the end of the manipulator 16. The tip tool guide apparatus 10 can be dismantled into the rotation supporting unit 14, the slide table 15, the manipulator 16, and the tip tool 17. The rotation supporting unit 14, the slide table 15, the manipulator 16, and the tip tool 17 can be assembled into the tip tool guide apparatus 10. A control device 18 is connected to the tip tool guide apparatus 10, and the control device 18 controls various operations of the tip tool guide apparatus 10.

The rotation supporting unit 14 includes a lower base 20 arranged at the bottom of the water chamber 1, a rotating unit 21 in a columnar shape mounted on the upper portion of the lower base 20 and rotatably movable relative to the lower base 20, and an upper supporting unit 22 mounted on the upper portion of the rotating unit 21 and movable in the vertical direction relative to the lower base 20 by an elevating mechanism mounted on the rotating unit 21.

To mount the rotation supporting unit 14, the lower base 20 is set at the bottom of the water chamber 1, and the upper supporting unit 22 is lifted upward in the vertical direction by the elevating mechanism and pressed against the ceiling of the water chamber 1. Accordingly, the rotation supporting unit 14 is fixed to the bottom and the ceiling of the water chamber 1 while being stretched in the vertical direction.

The slide table 15 includes a table portion 30 in which the base portion is connected to the upper portion of the rotating unit 21, a sliding unit 31 that slidably moves on the table portion 30, and a supporting unit 23 rotatably connected to the end of the table portion 30 interposing a rotary shaft 24 therebetween. The sliding unit 31 is slidably moved by a driving unit, which is not shown. The sliding unit 31 includes a first tool changer 32 to which the manipulator 16 is detachably mounted. The base portion of the supporting unit 23 is movable between a storing position and a supporting position about the rotary shaft 24, and the base portion of the supporting unit 23 is connected to the lower portion of the rotating unit 21.

To mount the slide table 15 on the rotation supporting unit 14, the base portion of the table portion 30 is connected to the upper portion of the rotating unit 21, and the base portion of the supporting unit 23 is connected to the lower portion of the rotating unit 21 by rotating the base portion of the supporting unit 23 from the storing position to the supporting position.

The manipulator 16 is a so-called seven-axis manipulator, and the base portion is detachably connected to the first tool changer 32 of the sliding unit 31. A second tool changer 35 to which the tip tool 17 is detachably mounted is fixed to the end of the manipulator 16. The control device 18 controls the motion of the manipulator 16.

The tip tool 17, for example, may be a tip tool to perform shot peening on the process surface 4 and a tip tool to examine the process surface 4. In the following example, a tip tool for shot peening is used.

As shown in FIG. 2, the tip tool 17 includes a tool main body 40 in a rectangular parallelepiped, an air cylinder 41 provided on the side of the tool main body 40, and four omni-directional rollers 42a, 42b, 42c, and 42d provided on an installation surface of the tool main body 40 facing the process surface 4. The tip tool 17 also includes four distance measuring sensors 43a, 43b, 43c, and 43d.

The base portion of the air cylinder 41 is mounted on the second tool changer 35 of the manipulator 16, and the tool main body 40 is fixed to the end of the air cylinder 41. Accordingly, when the four omni-directional rollers 42a, 42b, 42c, and 42d of the tool main body 40 are pressed against the process surface 4 by the manipulator 16, the air cylinder 41 is contracted by the reaction force from the process surface 4. When the tool main body 40 is detached from the process surface 4 by the manipulator 16, the air cylinder 41 is extended. In other words, the width of the air cylinder 41 is extended and contracted with the attachment and detachment of the tool main body 40 to and from the process surface 4. Accordingly, a gap error between the tool main body 40 and the process surface 4 is absorbed.

The four omni-directional rollers 42a, 42b, 42c, and 42d are provided on the installation surface of the tool main body 40, and formed of a first omni-directional roller 42a (upper right in the diagram), a second omni-directional roller 42b (lower right in the diagram), a third omni-directional roller 42c (upper left in the diagram), and a fourth omni-directional roller 42d (lower left in the diagram). The four omni-directional rollers 42a, 42b, 42c, and 42d are arranged in a positional relationship of four apexes of a rectangle. In other words, the four omni-directional rollers 42a, 42b, 42c, and 42d are arranged in a rectangular matrix.

The four distance measuring sensors 43a, 43b, 43c, and 43d include a first distance measuring sensor 43a (upper right in the diagram), a second distance measuring sensor 43b (lower right in the diagram), a third distance measuring sensor 43c (upper left in the diagram), and a fourth distance measuring sensor 43d (lower left in the diagram). The four distance measuring sensors 43a, 43b, 43c, and 43d measure the distance between the tip tool 17 and the process surface 4. The four distance measuring sensors 43a, 43b, 43c, and 43d are arranged at the side of the tool main body 40, and similar to the four omni-directional rollers 42a, 42b, 42c, and 42d, are arranged in a positional relationship of four apexes of a rectangle. In other words, the four distance measuring sensors 43a, 43b, 43c, and 43d are also arranged in a rectangular matrix.

As the distance measuring sensor, for example, a stroke contact type displacement gauge is used, and the ends of the four distance measuring sensors 43a, 43b, 43c, and 43d are arranged so as to be projected from the installation surface of the tool main body 40, and projected with the same length. The measurement results obtained by the four distance measuring sensors 43a, 43b, 43c, and 43d are output to the control device 18. In the present embodiment, the contact type displacement gauge is used. However a non-contact type displacement gauge such as a laser displacement gauge may also be used.

The control device 18 connected to the tip tool guide apparatus 10 will now be described. The control device 18 is formed mainly of a central processing unit (CPU), read-only memory (ROM), random access memory (RAM), and the like. By cooperatively controlling the tip tool guide apparatus 10, it is possible to allow the tip tool guide apparatus 10 to perform various operations.

The control device 18 includes a movement locus setting unit 50 that sets a movement locus on which the tip tool 17 is moved along the process surface 4, a motion controlling unit 51 that so controls the motion of the manipulator 16 that the tip tool 17 is moved along the set movement locus with the posture thereof following the process surface 4, and a motion correction controlling unit 52 that corrects the motion control of the manipulator 16, so as to correct the posture of the tip tool 17 that moves along the movement locus.

The movement locus setting unit 50, based on various data, sets a movement locus from the movement start position to the movement end position, so that the tip tool 17 moves on the inner peripheral surface (process surface 4) of the welded portion between the pipe base 2 and the cylindrical pipe 3, over the entire circumferential direction (around one circle).

The motion controlling unit 51 controls the motion of the manipulator 16, so as to perform the following-operation, in which the posture of the tip tool 17 is moved on the set movement locus from the movement start position to the movement end position with the posture thereof following the process surface 4. In other words, the motion controlling unit 51 so controls the motion of the manipulator 16 that the tip tool 17 and the process surface 4 become parallel to each other (technically speaking, because the process surface 4 is curved, in the tangential direction of the process surface 4, to be precise).

When the posture of the tip tool 17 that moves on the movement locus while following the process surface 4 is shifted due to an error or the like, the motion correction controlling unit 52 corrects the motion of the manipulator 16 so as to correct the posture of the tip tool 17, based on the measurement results of the four distance measuring sensors 43a, 43b, 43c, and 43d (details will be described later). In other words, a posture controlling unit in the claims is the motion correction controlling unit 52.

A series of process control operations in which the tip tool guide apparatus 10 performs processing on an inner peripheral surface (process surface 4) of the welded portion between the pipe base 2 and the cylindrical pipe 3 will now be described. The process control operations include a movement locus setting step, a measuring sensor positioning step (measuring unit positioning step), a motion controlling step, and a motion correction controlling step (posture controlling step).

In the movement locus setting step, the movement locus setting unit 50 sets a movement locus of the tip tool 17 from the movement start position to the movement end position over the entire circumferential direction (see FIG. 2).

As shown in FIG. 3, in the measuring sensor positioning step, the tip tool 17 and the four distance measuring sensors 43a, 43b, 43c, and 43d attached to the tip tool 17 are made to face the process surface 4, at the movement start position of the set movement locus. At this time, the process surface 4 of the cylindrical pipe 3 at the movement start position is divided into four virtual partitioned areas E1, E2, E3, and E4 by a first virtual boundary line K1 extended in the pipe axis direction of the process surface 4, and a second virtual boundary line K2 extended in the tangential direction (perpendicular direction) perpendicular to the first virtual boundary line K1. The four virtual partitioned areas E1, E2, E3, and E4 include a first virtual partitioned area E1 (upper right in the diagram), a second virtual partitioned area E2 (lower right in the diagram) adjacent to the first virtual partitioned area E1 in the pipe axis direction, a third virtual partitioned area E3 (upper left in the diagram) adjacent to the first virtual partitioned area E1 in the tangential direction, and a fourth virtual partitioned area E4 (lower left in the diagram) adjacent to the second virtual partitioned area E2 in the tangential direction and also adjacent to the third virtual partitioned area E3 in the pipe axis direction.

The control device 18 controls the manipulator 16 and makes the four distance measuring sensors 43a, 43b, 43c, and 43d come in contact with and face the process surface 4, so that the first distance measuring sensor 43a face the first virtual partitioned area E1, the second distance measuring sensor 43b face the second virtual partitioned area E2, the third distance measuring sensor 43c face the third virtual partitioned area E3, and the fourth distance measuring sensor 43d face the fourth virtual partitioned area E4. Accordingly, the four distance measuring sensors 43a, 43b, 43c, and 43d can be suitably brought into contact with the process surface 4, without having the first distance measuring sensor 43a and the fourth distance measuring sensor 43d overlap with the first virtual boundary line K1 or the second virtual boundary line K2, or without having the second distance measuring sensor 43b and the third distance measuring sensor 43c overlap with the first virtual boundary line K1 or the second virtual boundary line K2. The four distance measuring sensors 43a, 43b, 43c, and 43d can also be suitably brought into contact with the process surface 4, without having a plurality of distance measuring sensors faces one virtual partitioned area.

In the motion controlling step, the motion controlling unit 51 of the control device 18 controls the manipulator 16, and moves the tip tool 17 from the movement start position to the movement end position along the set movement locus, while maintaining the posture of the tip tool 17 relative to the process surface 4.

In the motion correction controlling step, the motion correction controlling unit 52 feedback controls the posture of the tip tool 17 by correcting the motion of the manipulator 16 in real time during the following-operation performed by the tip tool 17 that moves on the movement locus.

The motion correction controlling step of the manipulator 16 for correcting the posture of the tip tool 17, that is a feature of the present embodiment, will now be described in detail.

The motion correction controlling step of the manipulator 16, in other words, the posture controlling step of the tip tool 17, includes a pitch axis posture controlling step of, based on the measurement results of the four distance measuring sensors 43a, 43b, 43c, and 43d brought into contact with the process surface 4, controlling the posture of the tip tool 17 in the rotational direction about a pitch axis extended in the tangential direction. The motion correction controlling step also includes a yaw axis posture controlling step of controlling the posture of the tip tool 17 in the rotational direction about a yaw axis extended in the pipe axis direction, and a roll axis posture controlling step of controlling the posture of the tip tool 17 in the rotational direction about a roll axis extended in the separating direction of the tip tool 17 from the process surface 4. The relationship of the tangential direction, the pipe axis direction, and the separating direction is the same as that of the X-axis direction (pipe axis direction), the Y-axis direction (tangential direction), and the Z-axis direction (separating direction), and is a coordinate system based on the tip tool 17. In the following example, the posture of the tip tool 17 is controlled so as to be in parallel with the process surface 4 in the tangential direction, the pipe axis direction, and the separating direction.

In the measuring sensor positioning step, upon bringing the four distance measuring sensors 43a, 43b, 43c, and 43d in contact with the process surface 4, a distance between the tip tool 17 and the process surface 4 is calculated by the four distance measuring sensors 43a, 43b, 43c, and 43d.

In the pitch axis posture controlling step, the posture of the tip tool 17 in the rotational direction about the pitch axis is controlled, based on a difference obtained by subtracting a second measurement distance L2 measured by the second distance measuring sensor 43b from a first measurement distance L1 measured by the first distance measuring sensor 43a (L1–L2), and a difference obtained by subtracting a fourth measurement distance L4 measured by the fourth distance measuring sensor 43d from a third measurement distance L3 measured by the third distance measuring sensor 43c (L3–L4). More specifically, the posture of the tip tool 17 is controlled, based on a pitch component control amount obtained by equation (1) shown in calculation 1. At this time, Gp is a pitch control gain, and a suitable gain is set based on the operational environment.

[Calculation 1]

Pitch component control amount (deg) (1)
$$\left\{\frac{(L_1 - L_2) + (L_3 - L_4)}{2}\right\} \times G_P$$

Yaw component control amount (deg) (2)
$$\left\{\frac{(L_1 - L_3) + (L_2 - L_4)}{2}\right\} \times G_Y$$

Roll component control amount (deg) (3)
$$\left\{\frac{(L_2 + L_3) - (L_1 + L_4)}{2}\right\} \times G_R$$

Pitch control gain: $G_P$
Yaw control gain: $G_Y$
Roll control gain: $G_R$

For example, the tip tool 17 rotates about the pitch axis, while the posture of the tip tool 17 about the pitch axis is in parallel with the process surface 4. Accordingly, the first measurement distance L1 and the third measurement distance L3 are extended, and the second measurement distance L2 and the fourth measurement distance L4 are shortened. Alternatively, the first measurement distance L1 and the third measurement distance L3 are shortened, and the second measurement distance L2 and the fourth measurement distance L4 are extended. In other words, when the posture of the tip tool 17 is rotated, the difference obtained by subtracting the second measurement distance L2 from the first measurement distance L1, and the difference obtained by subtracting the fourth measurement distance L4 from the third measurement distance L3 are increased. Consequently, to control the posture of the tip tool 17 so as to return to the original position, in other words, to control the posture of the tip tool 17 so as to be in parallel with the process surface 4, the motion of the manipulator 16 is controlled by bringing the difference obtained by subtracting the second measurement distance L2 from the first measurement distance L1, and the difference obtained by subtracting the fourth measurement distance L4 from the third measurement distance L3 close to zero.

In the yaw axis posture controlling step, the posture of the tip tool 17 in the rotational direction about the yaw axis is controlled, based on a difference obtained by subtracting the third measurement distance L3 from the first measurement distance L1 (L1–L3), and a difference obtained by subtracting the fourth measurement distance L4 from the second measurement distance L2 (L2–L4). More specifically, the posture of the tip tool 17 is controlled, based on a yaw component control amount obtained by equation (2) shown in calculation 1. At this time, Gy is a yaw control gain, and a suitable gain is set based on the operational environment.

For example, the tip tool 17 rotates about the yaw axis, while the posture of the tip tool 17 about the yaw axis is in parallel with the process surface 4. Accordingly, the first measurement distance L1 and the second measurement distance L2 are extended, and the third measurement distance L3 and the fourth measurement distance L4 are shortened. Alternatively, the first measurement distance L1 and the second measurement distance L2 are shortened, and the third measurement distance L3 and the fourth measurement distance L4 are extended. In other words, when the posture of the tip tool 17 is rotated, a difference obtained by subtracting the third measurement distance L3 from the first measurement distance L1, and a difference obtained by subtracting the fourth measurement distance L4 from the second measurement distance L2 are increased. Consequently, to control the posture of the tip tool 17 so as to return to the original position, in other words, to control the posture of the tip tool 17 so as to be in parallel with the process surface 4, the motion of the manipulator 16 is controlled by brining the difference obtained by subtracting the third measurement distance L3 from the first measurement distance L1 and the difference obtained by subtracting the fourth measurement distance L4 from the second measurement distance L2 close to zero.

The roll axis posture controlling step controls the posture of the tip tool 17 in the rotational direction about the roll axis, based on a difference obtained by subtracting a second total distance (L1+L4) obtained by adding the first measurement distance L1 and the fourth measurement distance L4, from a first total distance (L2+L3) obtained by adding the second measurement distance L2 and the third measurement distance L3. More specifically, the posture of the tip tool 17 is controlled, based on a roll component control amount obtained by equation (3) shown in calculation 1. At this time, Gr is a roll control gain, and a suitable gain is set based on the operational environment.

For example, the tip tool 17 rotates about the roll axis, while the posture of the tip tool 17 about the roll axis is in parallel with the process surface 4. Accordingly, the second measurement distance L2 and the third measurement distance L3 are extended, and the first measurement distance L1 and the fourth measurement distance L4 are shortened. Alternatively, the second measurement distance L2 and the third measurement distance L3 are shortened, and the first measurement distance L1 and the fourth measurement distance L4 are extended. In other words, when the posture of the tip tool 17 is rotated, the difference obtained by subtracting the second total distance (L1+L4) from the first total distance (L2+L3) is increased. Consequently, to control the posture of the tip tool 17 so as to return to the original position, the motion of the manipulator 16 is controlled by bringing the difference obtained by subtracting the second total distance (L1+L4) from the first total distance (L2+L3) close to zero.

In the configuration above, the posture of the tip tool 17 can be controlled about the pitch axis, the yaw axis, and the roll axis, in a simple manner by executing the motion correction controlling step (posture controlling step) including the pitch axis posture controlling step, the yaw axis posture controlling step, and the roll axis posture controlling step. It is also possible to make the tip tool 17 face the process surface 4, while the posture of the tip tool 17 is made to follow the process surface 4 of the cylindrical pipe 3, in other words, while the posture of the tip tool 17 is in parallel with the process surface 4 in the tangent direction, the pipe axis direction, and the separating direction.

By executing the motion correction controlling step in real time, during the following-operation performed by the tip tool 17, the posture of the tip tool 17 can be feedback controlled. Accordingly, even if the tip tool 17 moves along the process surface 4, the posture of the tip tool 17 is always maintained in the posture following the process surface 4.

When the motion correction controlling step is executed on the process surface 4 of the round pipe having the elliptical or oval cross-section, the posture of the tip tool 17 can be controlled by executing the motion correction controlling step while suitably varying the control gains Gp, Gy, and Gr, corresponding to the process surface 4. When the process surface 4 is the outer peripheral surface of the round pipe, the motion correction controlling step can be applied by reversing the plus and minus in equation (3) (by multiplying minus) in the roll axis posture controlling step. The movement locus need not be set over the entire circumferential direction, but may be set arbitrarily.

A first modification of the tip tool guide apparatus 10 according to the present embodiment will now be described. To prevent repetition, only the different portions will be described. In the tip tool guide apparatus 10 according to the first modification, the tip tool 17 is moved along the movement locus, while maintaining a gap distance between the tip tool 17 and the process surface 4 at a predetermined distance (set distance).

More specifically, the motion correction controlling step further includes a gap distance setting step. In the gap distance setting step, a gap distance between the tip tool 17 and the process surface 4 is controlled to be a set distance component Ls, based on a difference obtained by subtracting the set distance component Ls from an average distance component of the first measurement distance L1, the second measurement distance L2, the third measurement distance L3, and the fourth measurement distance L4. In other words, the gap distance between the tip tool 17 and the process surface 4 is controlled, based on a pressing component control amount obtained by equation (4) shown in calculation 2. At this time, Gs is a pressing control gain, and a suitable gain is set based on the operational environment.

[Calculation 2]

Pressing component control amount (mm) (4)

$$\left\{\frac{L_1 + L_2 + L_3 + L_4}{4} - L_S\right\} \times G_S$$

Set distance component: $L_S$
Pressing control gain: $G_S$

For example, when the gap distance between the tip tool 17 and the process surface 4 does not have the set distance component Ls with the posture of the tip tool 17 following the process surface 4, the difference obtained by subtracting the set distance component Ls from the average distance component is increased. Accordingly, to set the gap distance between the tip tool 17 and the process surface 4 to the set distance Ls, the motion of the manipulator 16 is controlled by brining the difference obtained by subtracting the set distance component Ls from the average distance component close to zero.

In the configuration above, the posture of the tip tool 17 can be controlled about the pitch axis, the yaw axis, and the roll axis. It is also possible for the tip tool 17 to perform the following-operation, while maintaining the gap distance between the tip tool 17 and the process surface 4 at the set distance Ls. In this case, the air cylinder 41 and the omni-directional rollers 42a, 42b, 42c, and 42d provided on the tip tool 17 may be eliminated.

A second modification of the tip tool guide apparatus 10 according to the present embodiment will now be described. To prevent repetition, only the different portions will be described. In the tip tool guide apparatus 10 according to the second modification, the posture of the tip tool 17 is made to face the process surface 4 at a desired initial posture, and the tip tool 17 is moved along the movement locus while maintaining the initial posture.

More specifically, the posture of the tip tool 17 is controlled, based on equation (5) shown in calculation 3, obtained by subtracting an angle component Fp of the initial posture in the rotational direction about the pitch axis of the tip tool 17 set in advance, from equation (1) in the pitch axis posture controlling step. Similarly, the posture of the tip tool 17 is controlled, based on equations (6) and (7) shown in calculation 3, obtained by subtracting angle components Fy and Fr of the initial postures in the rotational directions about the yaw axis and the roll axis of the tip tool 17 set in advance, from equations (2) and (3) in the yaw axis posture controlling step and the roll axis posture controlling step.

[Calculation 3]

Pitch angle componrnt $F_P$ relative to initial posture (5)
Yaw angle component $F_Y$ relative to initial posture
Roll angle component $F_R$ relative to initial posture
Pitch component control amount (deg)

$$\left\{\frac{(L_1 - L_2) + (L_3 - L_4)}{2} - F_P\right\} \times G_P$$

Yaw component control amount (deg) (6)

$$\left\{\frac{(L_1 - L_3) + (L_2 - L_4)}{2} - F_Y\right\} \times G_Y$$

Roll component control amount (deg) (7)

$$\left\{\frac{(L_2 + L_3) - (L_1 + L_4)}{2} - F_R\right\} \times G_R$$

For example, the tip tool 17 rotates about the pitch axis, while the posture of the tip tool 17 about the pitch axis is in the initial posture Fp. Accordingly, a difference obtained by subtracting the initial posture Fp from the posture of the tip tool calculated by equation (1) is increased. Consequently, to return the tip tool 17 to the initial posture, the motion of the manipulator 16 is controlled by brining the difference obtained by subtracting the initial posture Fp from the posture of the tip tool calculated by equation (1), in other words, a value of equation (5), close to zero. Because the same applies to the yaw axis posture controlling step and the roll axis posture controlling step, descriptions thereof will be omitted.

In the configuration above, the posture of the tip tool 17 can be controlled about the pitch axis, the yaw axis, and the roll axis. It is also possible for the tip tool 17 to perform the following-operation, while maintaining the posture of the tip tool 17 at the initial posture. In this case, it is preferable to arrange the posture of the tip tool 17 to a suitable initial posture, corresponding to various processes.

INDUSTRIAL APPLICABILITY

In this manner, the posture control method and the posture control device according to the present invention are suitable for processing the inner peripheral surface and the outer peripheral surface of the round pipe. More specifically, the posture control method and the posture control device according to the present invention are suitable for processing the welded portion of the round pipe.

The invention claimed is:

1. A posture control method that controls a posture of a processing unit relative to a process surface by measuring a gap distance between the processing unit that performs processing on an inner peripheral surface or an outer peripheral surface of a round pipe and the process surface of the round pipe to be processed by the processing unit, the posture control method comprising:

disposing a plurality of distance measuring units in the processing unit, and at least four given distance measuring units being arranged to face the process surface in a positional relationship of four apexes of a rectangle;

controlling the posture of the processing unit in a rotational direction about a roll axis, based on a difference between a first total distance obtained by adding distances measured by two out of the four given distance measuring units located in one diagonal position, and a second total distance obtained by adding measurement distances measured by the other two distance measuring units located in the other diagonal position;

wherein the process surface that the distance measuring units face is divided into four virtual partitioned areas, based on a first virtual boundary line extended in a pipe axis direction of the process surface and a second virtual boundary line extended in a perpendicular direction perpendicular to the first virtual boundary line, and the four virtual partitioned areas are composed of a first virtual partitioned area, a second virtual partitioned area adjacent to the first virtual partitioned area in the pipe axis direction, a third virtual partitioned area adjacent to the first virtual partitioned area in the perpendicular direction, and a fourth virtual partitioned area adjacent to the second virtual partitioned area in the perpendicular direction and also adjacent to the third virtual partitioned area in the pipe axis direction, and the posture control method further comprises:

positioning measuring units that, among the four given distance measuring units, makes a first distance measuring unit face the first virtual partitioned area, makes a second distance measuring unit face the second virtual partitioned area, makes a third distance measuring unit face the third virtual partitioned area, and makes a fourth distance measuring unit face the fourth virtual partitioned area, wherein the controlling the posture controls the posture of the processing unit in the rotational direction about the roll axis, based on a difference between the first total distance obtained by adding a second measurement distance measured by the second distance measuring unit and a third measurement distance measured by the third distance measuring unit, and the second total distance obtained by adding a first measurement distance measured by the first distance measuring unit and a fourth measurement distance measured by the fourth distance measuring unit.

2. A posture control device that controls a posture of a processing unit that performs processing on an inner peripheral surface or an outer peripheral surface of a round pipe, the posture control device comprising:

a plurality of distance measuring units that is included in the processing unit, and measures a gap distance between the processing unit and a process surface of the round pipe to be processed by the processing unit;

a posture controlling unit that controls the posture of the processing unit relative to the process surface, based on measurement results of at least four given distance measuring units, among the distance measuring units, wherein the four given distance measuring units are arranged to face the process surface in a positional relationship of four apexes of a rectangle, and the posture controlling unit controls the posture of the processing unit in a rotational direction about a roll axis, based on a difference between a first total distance obtained by adding measurement distances measured by two distance measuring units located in one diagonal position among the four given distance measuring units, and a second total distance obtained by adding measurement distances measured by two distance measuring units located in another diagonal position;

wherein the process surface that the distance measuring units face is divided into four virtual partitioned areas, based on a first virtual boundary line extended in a pipe axis direction of the process surface, and a second virtual boundary line extended in a perpendicular direction perpendicular to the first virtual boundary line, the four virtual partitioned areas are composed of a first virtual partitioned area, a second virtual partitioned area adjacent to the first virtual partitioned area in the pipe axis direction, a third virtual partitioned area adjacent to the first virtual partitioned area in the perpendicular direction, and a fourth virtual partitioned area adjacent to the second virtual partitioned area in the perpendicular direction and also adjacent to the third virtual partitioned area in the pipe axis direction, among the four given distance measuring units, a first distance measuring unit is made to face the first virtual partitioned area, a second distance measuring unit is made to face the second virtual partitioned area, a third distance measuring unit is made to face the third virtual partitioned area, and a fourth distance measuring unit is made to face the fourth virtual partitioned area, and the posture controlling unit controls the posture of the processing unit in the rotational direction about the roll axis, based on a difference between the first total distance obtained by adding the second measurement distance measured by the second distance measuring unit and the third measurement distance measured by the third distance measuring unit, and the second total distance obtained by adding the first measurement distance measured by the first distance measuring unit and the fourth measurement distance measured by the fourth distance measuring unit.

* * * * *